United States Patent [19]
Kakihara et al.

[11] Patent Number: 5,959,810
[45] Date of Patent: Sep. 28, 1999

[54] SPIN-VALVE MAGNETORESISTIVE ELEMENT WITH BIASING LAYER

[75] Inventors: Yoshihiko Kakihara; Masamichi Saito, both of Niigata-ken, Japan

[73] Assignee: Alps Electric Co., Ltd., Tokyo, Japan

[21] Appl. No.: 08/975,955

[22] Filed: Nov. 21, 1997

[30] Foreign Application Priority Data

Nov. 22, 1996 [JP] Japan ................................. 8-312042

[51] Int. Cl.⁶ ....................................................... G11B 5/39
[52] U.S. Cl. ................................................................ 360/113
[58] Field of Search ............................................. 360/113

[56] References Cited

U.S. PATENT DOCUMENTS

| | | | |
|---|---|---|---|
| 5,018,037 | 5/1991 | Krounbi et al. | 360/113 |
| 5,079,035 | 1/1992 | Krounbi et al. | 427/130 |
| 5,285,339 | 2/1994 | Chen et al. | 360/113 |
| 5,434,826 | 7/1995 | Ravipati et al. | 367/140 |
| 5,438,470 | 8/1995 | Ravipati et al. | 360/113 |
| 5,442,507 | 8/1995 | Koga et al. | 360/113 |
| 5,491,600 | 2/1996 | Chen et al. | 360/113 |
| 5,495,378 | 2/1996 | Bonyhard et al. | 360/113 |
| 5,554,265 | 9/1996 | Bonyhard et al. . | |
| 5,608,593 | 3/1997 | Kim et al. | 360/113 |
| 5,637,235 | 6/1997 | Kim et al. | 216/22 |
| 5,793,207 | 8/1998 | Gill | 360/113 |

*Primary Examiner*—A. J. Heinz
*Attorney, Agent, or Firm*—Brinks Hofer Gilson & Lione

[57] ABSTRACT

A spin-valve magnetoresistive element comprises an antiferromagnetic layer, a pinned magnetic layer, a nonmagnetic electrically conductive layer and a free magnetic layer formed in that order, and biasing layers formed on both sides of at least the free magnetic layer, the magnetization vector in the pinned magnetic layer being fixed by exchange anisotropic coupling with the antiferromagnetic layer, the biasing layers unifying the magnetization vector in the free magnetic layer in a direction perpendicular to the magnetization vector in the pinned magnetic layer, and a conductive path conducting a sensing current to the pinned magnetic layer, the nonmagnetic electrically conductive layer and the free magnetic layer. The antiferromagnetic layer extends to outer regions on both sides of the pinned magnetic layer, the nonmagnetic layer and the free magnetic layer. The biasing layers are formed on the antiferromagnetic layer. The top faces of the outer regions lie below the bottom face of the pinned magnetic layer, and the top faces of the biasing layers parallel to the deposited layers lie above the bottom face of the free magnetic layer in the sensing gap direction perpendicular to the deposited layers.

17 Claims, 4 Drawing Sheets

SPIN-VALVE MAGNETORESISTIVE ELEMENT WITH BIASING LAYER

BACKGROUND OF THE INVENTION

1. Field of the Invention

The present invention relates to a spin-valve magnetoresistive element, in which electrical resistance changes with the magnetization vector of a pinned magnetic layer and the magnetization vector of a free magnetic layer affected by an external magnetic field. In particular, the present invention relates to a spin-valve magnetoresistive element capable of suppressing the Barkhausen noise by a stable bias magnetic field applied to the free magnetic layer.

2. Description of the Related Art

FIG. 4 is a sectional view of a prior art spin-valve magnetoresistive element or spin-valve magnetoresistive head which detects a recording magnetic field from a hard disk. An antiferromagnetic layer 11, a pinned magnetic layer 2, a non-magnetic electrically conductive layer 3, a free magnetic layer and a protective layer 8 are formed on an underlayer 7 in that order, and hard biasing layers 6 are provided on both sides of these layers.

In general, the antiferromagnetic layer 11 is constructed of an iron-manganese (FeMn) alloy, the pinned magnetic layer 2 and the free magnetic layer 4 are constructed of an iron-nickel (FeNi) alloy, and the hard biasing layers are constructed of a cobalt-platinum (CoPt) alloy. The underlayer 7 and the protective layer 8 are constructed of nonmagnetic materials, such as tantalum.

In the production of the spin-valve magnetoresistive element shown in FIG. 4, the six layers from the underlayer 7 to the protective layer 8 are formed, the portions at both sides of the six deposited layers are removed by an etching process, such as an ion-milling process, so as to form slanted side faces, and the hard biasing layers 6 are formed on the slanted side faces. Each hard biasing layer 6 has a horizontal surface 6' parallel to the other layers and a slanted surface 6" according to the above-mentioned slanted side faces. The hard biasing layer 6 has a constant thickness h1 at the horizontal surface portion, and a decreasing thickness at the slanted surface portion.

The pinned magnetic layer 2 comes into contact with the antiferromagnetic layer 11 and is put into a single magnetic domain state by an exchange anisotropic magnetic field which is generated by an exchange coupling at an interface with the antiferromagnetic layer 11 to fix the magnetization vector in the Y direction. On the other hand, the magnetization vector of the free magnetic layer 4 is fixed in the X direction by the effect of the hard biasing layer 6 which is magnetized in the X direction.

In the spin-valve magnetoresistive element, electrically conductive layers 10 are formed on the hard biasing layers 6 with intermediate layers 9 formed therebetween, and the electrically conductive layers 10 supply a sensing current to the pinned magnetic layer 2, the nonmagnetic electrically conductive layer 3 and the free magnetic layer 4. The magnetic recording medium, such as a hard disk, scans in the Z direction. When a leakage magnetic field from the magnetic recording medium is applied to the free magnetic layer 4 in the Y direction, the magnetization vector of the free magnetic layer 4 varies from the X direction to the Y direction. The electrical resistance depends on the variation in the magnetization vector in the free magnetic layer 4 and the magnetization vector in the pinned magnetic layer 2, hence the leakage magnetic field from the magnetic recording medium is detected by the variation in the voltage due to the variation in the electrical resistance.

Although, in the prior art spin-valve magnetoresistive element, the pinned magnetic layer 2, the nonmagnetic electrically conductive layer 3 and the free magnetic layer 4 have relatively small thicknesses, while the antiferromagnetic layer 11 has a noticeably large thickness. For example, the pinned magnetic layer 2, the nonmagnetic electrically conductive layer 3 and the free magnetic layer 4 have thicknesses of 100 angstroms or less, and the antiferromagnetic layer 11 has a thickness of approximately 300 angstroms. As a result, the hard biasing layer 6 lies below the free magnetic layer 4 which is formed above the thick antiferromagnetic layer 11, and thus the horizontal surface 6' of the hard biasing layer 6 lies below the bottom face of the free magnetic layer 4. The side faces of free magnetic layer 4 barely come in contact with the thin slanted portion of the hard biasing layer 6.

Although the hard biasing layer 6 is magnetized in the X direction by the coercive force, the slanted portion of the hard biasing layer 6 cannot not apply a sufficient bias magnetic field in the X direction to the free magnetic layer 4 due to the small thickness of the slanted portion in the X direction. As a result, the magnetization vector of the free magnetic layer 4 is barely stabilized in the X direction, hence Barkhausen noise will occur.

SUMMARY OF THE INVENTION

It is an object of the present invention to provide a spin-valve magnetoresistive element capable of suppressing Barkhausen noise in which the horizontal surface of a hard biasing layer is formed so as to be close to the free magnetic layer, and more preferably so as to be above the bottom face of the free magnetic layer in order to stabilize the magnetization vector in the X direction.

It is another object of the present invention to provide a spin-valve magnetoresistive element provided with a buffer film which enhances crystal orientation in the biasing layer formed thereon and is constructed of, for example, chromium, between a hard biasing layer and an antiferromagnetic layer for generating a stable magnetic field.

In accordance with the present invention, a spin-valve magnetoresistive element comprises an antiferromagnetic layer, a pinned magnetic layer, a nonmagnetic electrically conductive layer and a free magnetic layer formed in that order. The magnetization vector in the pinned magnetic layer is fixed by exchange anisotropic coupling with the antiferromagnetic layer. There are biasing layers formed on both sides of at least the free magnetic layer, the biasing layers unifying the magnetization vector in the free magnetic layer in a direction perpendicular to the magnetization vector in the pinned magnetic layer. A conductive path conducting a sensing current to the pinned magnetic layer, the nonmagnetic electrically conductive layer and the free magnetic layer is also formed. The antiferromagnetic layer extends to outer regions on both sides of the pinned magnetic layer, the nonmagnetic layer and the free magnetic layer. The biasing layers are formed on the antiferromagnetic layer. The top faces of the outer regions lie below the bottom face of the pinned magnetic layer, and the top faces of the biasing layers parallel to the other layers lie above the bottom face of the free magnetic layer in the sensing gap direction perpendicular to the deposited layers.

Preferably, a metal film having a body centered cubic lattice structure oriented to (100) is formed as a buffer film between the antimagnetic layer and the biasing layer. The metal film may be formed of at least one material selected from the group consisting of Cr, Ti, Mo and W. When a molybdenum-tungsten (Mo—W) alloy is used, the preferable alloy composition is $W_{50}Mo_{50}$ wherein each suffix represents atomic percent. The metal film has a thickness in a range, preferably, from 18 angstroms to 55 angstroms, and more preferably, from 20 angstroms to 50 angstroms.

Preferably, the distance between the top face of the biasing layer and the bottom face of the free magnetic layer in the sensing gap direction is at least 60% of the thickness of the free magnetic layer.

In accordance with the present invention, the underlying antiferromagnetic layer extends on both sides of the pinned magnetic layer, the nonmagnetic electrically conductive layer and the free magnetic layer, and the hard biasing layer is formed on the antiferromagnetic layer. The hard biasing layer can therefore be formed at a position higher than the position in the prior art technology and near the free magnetic layer even if the antiferromagnetic layer has a large thickness, and the top face, parallel to the other layers, of the hard biasing layer can also be formed above the bottom face of the free magnetic layer.

A residual pinned magnetic layer on the antiferromagnetic layer after etching can be prevented by deep etching of the antiferromagnetic layer so that the antiferromagnetic layer is lower than the bottom face of the pinned magnetic layer, and thus a magneto-sensitive region comprising the free magnetic layer, the nonmagnetic electrically conductive layer and the pinned magnetic layer can be defined.

When the horizontal face of the hard biasing layer comes close to the free magnetic layer and more preferably the horizontal face of the hard biasing layer lies above the bottom face of the free magnetic layer, a strong bias magnetic field can be applied to the free magnetic layer in the longitudinal bias direction or X direction. The free magnetic layer therefore is more readily put into a single magnetic domain state in the direction perpendicular to the magnetization vector of the pinned magnetic layer compared to the conventional configuration, reducing Barkhausen noise occurrence.

When the metal film having a (100) oriented body centered cubic lattice structure is formed using chromium or the like as a buffer film under the biasing layer, the coercive force and the squareness ratio of the biasing layer is increased, and thus the bias magnetic field to put the magnetization in the free magnetic layer into a single magnetic domain state in the direction perpendicular to the magnetization vector in the pinned magnetic layer is increased. The Barkhausen noise is further decreased when the metal film has a thickness in a range of 18 angstroms to 55 angstroms, and particularly 20 angstroms to 50 angstroms.

DESCRIPTION OF THE PREFERRED EMBODIMENTS

Figure 1:
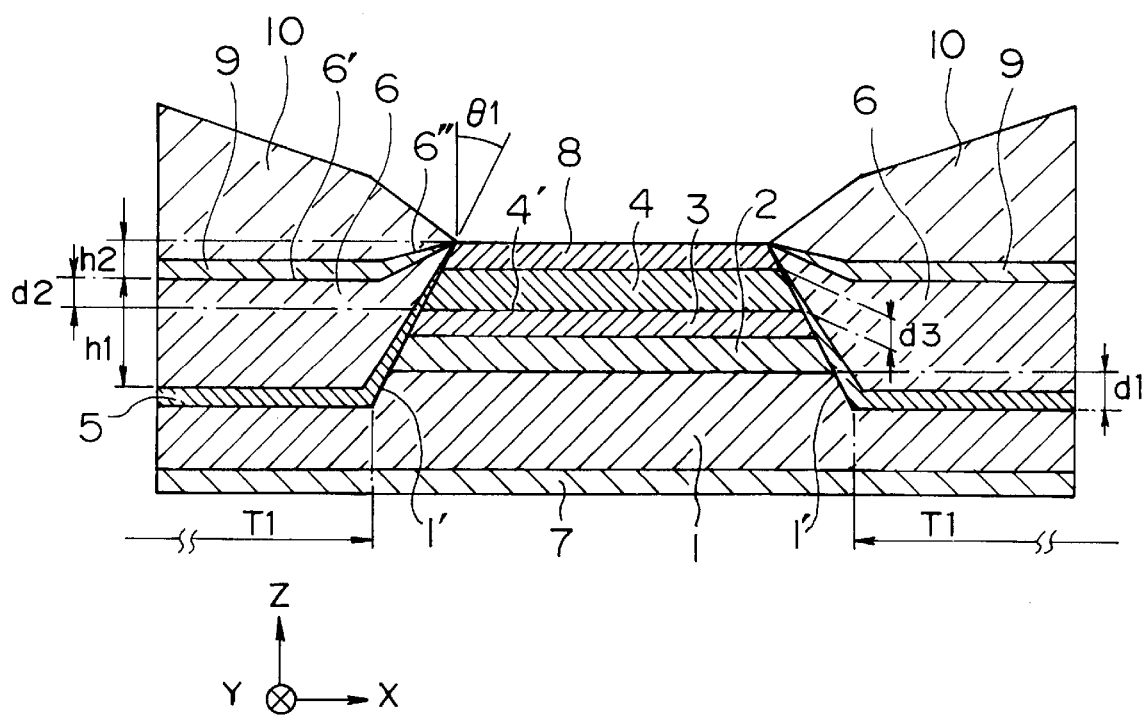
FIG. 1 is a sectional view of a spin-valve magnetoresistive element in accordance with the present invention.

FIG. 1 is a sectional view illustrating a central portion of a spin-valve magnetoresistive element extending in the X direction in accordance with the present invention.

The spin-valve magnetoresistive element, that is, magnetoresistive head is supported by the trailing end of a floating slider provided in a hard disk drive and detects a recording magnetic field from a magnetic recording medium such as a hard disk. The magnetic recording medium moves in the Z direction and the leakage magnetic field from the magnetic recording medium is in the Y direction.

In FIG. 1, an underlayer 7 is formed of a nonmagnetic material such as tantalum. An antiferromagnetic layer 1 composed of a platinum-manganese (PtMn) alloy and a pinned magnetic layer 2 composed of an iron-nickel (FeNi) alloy are formed on the underlayer 7. Also, a nonmagnetic electrically conductive layer 3 composed of a low electrical resistance material such as copper is formed on the pinned magnetic layer 2, a free magnetic layer 4 composed of an FeNi alloy is formed on the nonmagnetic electrically conductive layer 3, and a protective layer 8 composed of, for example, tantalum is formed on the free magnetic layer 4. The pinned magnetic layer 2, the nonmagnetic electrically conductive layer 3 and the free magnetic layer 4 have small thicknesses relative to the antiferromagnetic film 1. For example, the pinned magnetic layer 2 has a thickness of 40 angstroms, the nonmagnetic electrically conductive layer 3 has a thickness of 25 angstroms, the free magnetic layer 4 has a thickness of 80 angstroms, and the antiferromagnetic layer 1 has a thickness of 300 angstroms.

When the antiferromagnetic film 1 and the pinned magnetic layer 2 formed thereon are treated by heat in a given magnetic field, an exchange anisotropic magnetic field is generated at the interface between the two layers and the pinned magnetic layer is put into a single magnetic domain state in the Y direction to fix the magnetization vector in the Y direction.

The PtMn alloy used for the antiferromagnetic layer 1 in the present invention has several advantages as described below compared to the conventional FeMn alloy.

1) The PtMn alloy having higher corrosive resistance than the FeMn alloy is not corroded by various solvents and detergents used in production steps of spin-valve magnetoresistive elements, and is chemically stable under the severe operational environment of the spin-valve magnetoresistive elements.

2) The PtMn alloy having a higher blocking temperature than the FeMn alloy can generate a stable exchange anisotropic magnetic field and thus reduce reading errors even when the temperature of the magnetoresistive head rises during operation.

3) The PtMn alloy can generate a sufficient exchange anisotropic magnetic field even when the heat treatment temperature after the film formation is 230° C. or less. A heat treatment temperature of 250° C. or more will result in mutual diffusion at interfaces between the nonmagnetic electrically conductive layer 3, the pinned magnetic layer 2 and the free magnetic layer 4. The use of the PtMn alloy enabling a low temperature heat treatment, however, can prevent such diffusion.

Palladium-manganese (PdMn) alloys and Pt—Mn—X alloys, wherein X is Ni, Pd, Rh, Ru, Ir, Cr or Co, may be used instead of the PtMn alloys in order to achieve the above-mentioned advantages of the present invention.

The pinned magnetic layer 2 constructed of cobalt (Co), an iron-cobalt (Fe—Co) alloy, or an iron-cobalt-nickel (Fe—Co—Ni) alloy instead of the FeNi alloy can also generate an exchange anisotropic magnetic field at the interface with the antiferromagnetic layer 1. The free magnetic layer 4 can also be formed of such a magnetic material.

The spin-valve magnetoresistive element is produced as follows. After the six layers from the underlayer 7 to the protective layer 8 are deposited in that order by a series of sputtering processes, both side portions in the X direction of the pinned magnetic layer 2, the nonmagnetic electrically conductive layer 3, the free magnetic layer 4 and the protective layer 8 are removed by a dry etching process, such as an ion milling process, or by a combination of the dry etching process and a wet etching process, so as to leave the central portions of these layers. The antiferromagnetic layer 1 is also etched by a depth d1 during the dry etching process. After the etching process, both sides of these layers from the pinned magnetic layer 2 to the protective film 8 have a tilt angle θ1, and the antiferromagnetic layer 1 has slanted faces 1' at etched portions on both sides. The etching of both sides of the antiferromagnetic layer 1 can prevent a residual pinned magnetic layer 2 remaining on the antiferromagnetic layer 1 on which a metal film 5 will be formed. Since the pinned magnetic layer 2 on the antiferromagnetic layer is completely removed at the side portions, the magnetic-sensing region consisting of the free magnetic layer 4, nonmagnetic layer 3 and the pinned magnetic layer 2 can be provided within the slanted faces 1'.

A metal film 5 composed of chromium or the like is formed on the regions T1 of the antiferromagnetic layer 1 and on both slanted side faces of the laminate structure consisting of the antiferromagnetic layer 1, the pinned magnetic layer 2, the nonmagnetic electrically conductive layer 3 and the free magnetic layer 4, and functions as a buffer film which enhances crystal orientation in a hard biasing layer formed thereon.

The hard biasing layer 6 formed of a cobalt-platinum (CoPt) alloy is deposited on the metal film 5. As shown in FIG. 1, the hard biasing layer 6 has upper horizontal faces 6' parallel to the other layers and slanted surfaces 6" on the slanted side faces of the metal layer 5, such that the upper horizontal faces 6' lie above the bottom face of the free magnetic layer 4. In other words, when the direction of the sensing gap is in the Z direction perpendicular to the deposited layers, the upper horizontal faces 6' of the hard biasing layer 6 lie above the bottom face 4' of the free magnetic layer 4 in the sensing gap direction.

When the distance (referred to as an overlap depth) between the bottom face 4' of the free magnetic layer 4 and the upper horizontal face 6' in the sensing gap direction is d2 and the thickness of the free magnetic layer 4 is d3, it is preferable that the overlap ratio, (d2/d3)×100, be 60% or more. Since the hard biasing layer 6 is formed on the thick antiferromagnetic layer 1 with the metal layer 5 therebetween, the upper horizontal face 6' can come close to the bottom face 4', and preferably can be formed above the bottom face 4', even when the thickness h1 of the hard biasing layer 6 is small.

As a result, a major portion h1 of the hard biasing layers 6 comes in contact with each side of the free magnetic layer 4, a large bias magnetic field generated in the X direction from the major portion h1 of the hard biasing layer is applied to the free magnetic layer 4, and thus the free magnetic field 4 is readily put into a single magnetic domain state in the X direction. Such a structure therefore can reduce the Barkhausen noise and reading errors of the reading head.

The functions of the metal film 5 will now be described. Chromium in the metal film 5 has a body centered cubic (bcc) structure oriented to (100), and the CoPt alloy in the hard biasing layer 6 is composed of a mixed phase of a face centered cubic (fcc) structure and a hexagonal close-packed (hcp) structure. Since the lattice constant of the chromium crystal is very similar to the lattice constant of the hcp structure in the CoPt alloy, the CoPt alloy has the hcp structure rather than the fcc structure. The c axis of the hcp lattice is predominantly oriented in the interface between the CoPt alloy layer and the chromium layer. The hcp lattice has larger magnetic anisotropy in the c axis direction than the fcc lattice, hence a magnetic field applied to the hard biasing layer 6 forms a large coercive force Hc. Further, because the c axis of the hcp lattice is predominantly oriented along the interface between the CoPt alloy layer and the chromium layer, the residual magnetization Br increases and thus the squareness ratio S, i.e, residual magnetization Br/saturated magnetic flux density Bs, increases. As a result, a large bias magnetic field is generated from the hard biasing layer 6 and the free magnetic layer 4 is readily put into a single domain state.

The thickness of the metal film 5 is preferably in a range of from 18 angstrom to 55 angstrom, and more preferably in a range of from 20 angstrom to 50 angstrom, in order to significantly reduce the Barkhausen noise. When the thickness of the metal film 5 intervened between the free magnetic layer 4 and the hard biasing layer 6 exceeds the above-mentioned upper limit, the bias magnetic field applied to the free magnetic layer 4 from the hard biasing layer 6 is decreased by the metal film 5. On the other hand, a thickness of the metal film 5 of less than the above-mentioned lower limit causes exchange coupling of the antiferromagnetic layer 1 with the hard biasing layer 6, hence magnetization of these two layers is affected by each other and orthogonal characteristics between the magnetization of the antiferromagnetic layer 1 and the hard biasing layer 6 are decreased.

The metal film 5 may be constructed of at least one metal material, having a bcc lattice oriented to (100), selected from the group consisting of chromium (Cr) titanium (Ti), tungsten (W), molybdenum (Mo). When a molybdenum-tungsten (Mo—W) alloy is used, the preferable alloy composition is $W_{50}Mo_{50}$ wherein each suffix represents atomic percent. The hard biasing layer 6 may be constructed of a cobalt-chromium-tantalum (Co—Cr—Ta) alloy other than the CoPt alloy.

Interlayers 9 constructed of a nonmagnetic material such as tantalum are formed on the hard biasing layers 6, and electrically conductive layers 10 constructed of tungsten or copper are formed on the interlayers 9.

In the above-mentioned spin-valve magnetoresistive element, when a sensing current is conducted to the pinned magnetic layer 2, the nonmagnetic electrically conductive layer 3 and the free magnetic layer 4 thorough the electrically conductive layer 10 and when a magnetic field is applied to these layers from the recording medium in the Y direction, the magnetization vector in the free magnetic layer 4 changes from the X direction to the Y direction. Electrons transferring from one of the free magnetic layer 4 and the pinned magnetic layer 2 to the other are scattered in the interfaces between the nonmagnetic electrically conductive layer 3 and the pinned magnetic layer 2 and between the nonmagnetic electrically conductive layer 3 and the free magnetic layer 4 thus changing the sensing current. The change in the sensing current is detected and forms an output signal.

Since the hard biasing layer 6 is formed on the antiferromagnetic layer 1 and over the side faces of the pinned magnetic layer 2, the nonmagnetic conductive layer 3 and the free magnetic layer 4, the hard biasing layer 6 comes in contact with these four layers from the antiferromagnetic layer 1 to the free magnetic layer 4 with a large contact area. The direct current electric resistance (DCR) of the spin-valve magnetoresistive element therefore can be reduced. As a result, large detecting outputs which reduces reading errors can be obtained.

EXAMPLE

A spin-valve magnetoresistive element as shown FIG. 1 was prepared to measure the Barkhausen noise. An antiferromagnetic layer 1 having a thickness of 300 angstroms was formed of a PtMn alloy. Since the antiferromagnetic layer 1 was etched so as to have an etching depth d1 of 100 angstroms, the regions T1 of the antiferromagnetic layer 1 had a thickness of 200 angstroms. A pinned magnetic layer 2 having a thickness of 40 angstroms was formed of an FeNi alloy thereon, a nonmagnetic electrically conductive layer 3 having a thickness of 25 angstroms was formed of copper thereon, and a free magnetic layer 4 having a thickness of 80 angstroms was formed of an FeNi alloy thereon. Further, a hard biasing layer 6 was formed of a CoPt alloy so that the thickness h1 of the horizontal face 6' was 300 angstrom. An underlayer 7 was formed of tantalum and had a thickness of 40 angstroms, and a protective film 8 was formed of tantalum and had a thickness of 50 angstroms. An interlayer 9 was also formed of tantalum, and an electrically conductive layer 10 was formed of chromium. The angle θ1 between the perpendicular line and the slanted face, which was formed on both sides of the pinned magnetic layer 2 to the protective film 8, was 20°.

Eight types of magnetoresistive heads which were provided with chromium metal films 5 having different thicknesses, i.e., 10, 15, 20 30, 40, 50, 60 and 70 angstroms, and twenty magnetoresistive heads for each thickness were made, and the number of the magnetoresistive heads in which the Barkhausen noise was observed was counted. The results are shown in Table 1.

TABLE 1

Percentage of Heads Exhibiting the Barkhausen Noise versus Thickness of Buffer Film

| Buffer film thickness (Å) | Number of heads exhibiting the noise | Percentage of heads exhibiting the noise (%) |
|---|---|---|
| 10 | 20/20 | 100 |
| 15 | 12/20 | 60 |
| 20 | 2/20 | 10 |
| 30 | 1/20 | 5 |
| 40 | 1/20 | 5 |
| 50 | 2/20 | 10 |
| 60 | 6/20 | 30 |
| 70 | 12/20 | 60 |

Figure 2:
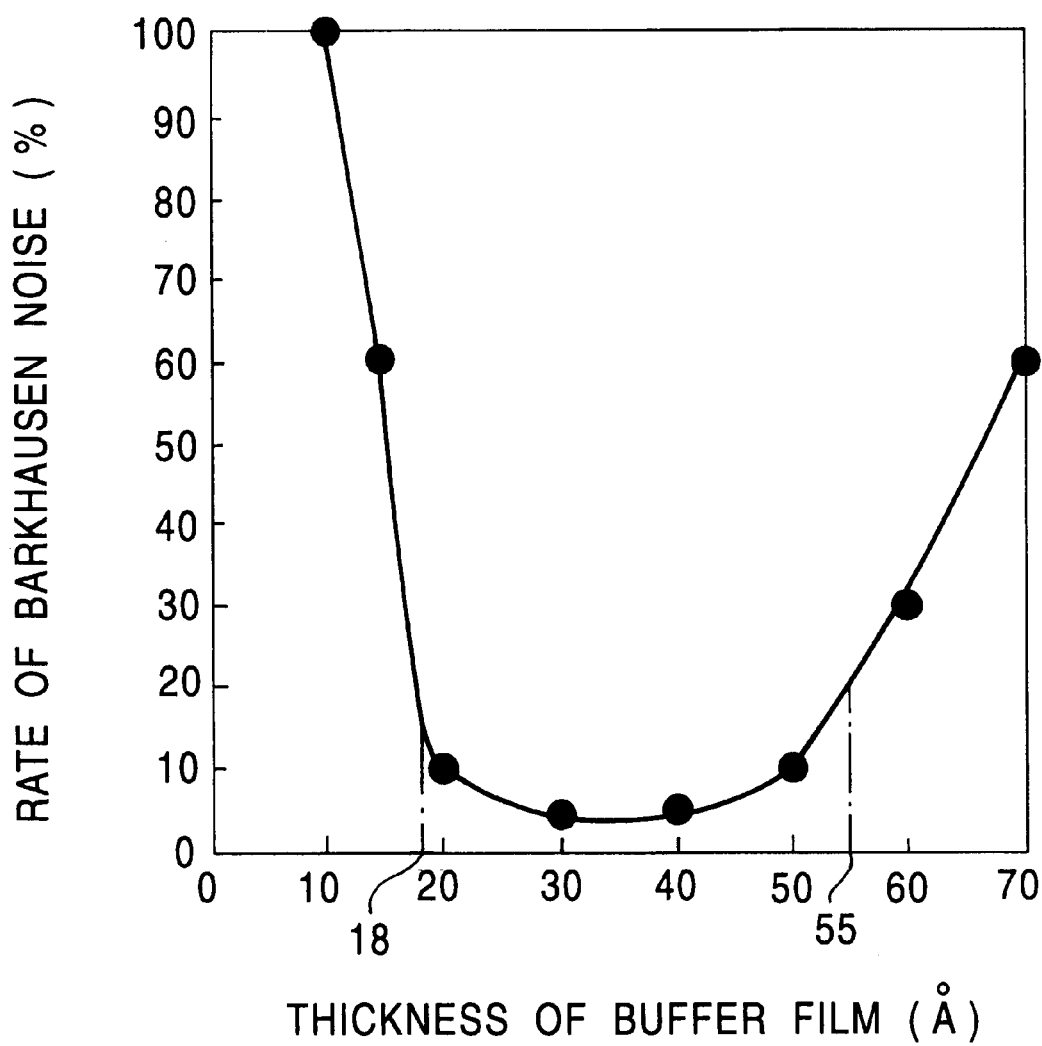
FIG. 2 is a graph illustrating the percentage of magnetoresistive heads which exhibit Barkhausen noise versus the thickness of the buffer film.

FIG. 2 is a graph illustrating the percentage of magnetoresistive heads which exhibit Barkhausen noise versus the thickness of the metal film 5 as the buffer film. FIG. 2 demonstrates that the percentage of the Barkhausen noise gradually decreases with the thickness of the metal film 5 and has a minimum value at a thickness of 30 angstroms or 40 angstroms. The percentage of heads exhibiting Barkhausen noise gradually increases for a thicknesses of more than 50 angstroms. When the thickness of the metal film 5 is in a range of from 18 angstroms to 55 angstroms, the percentage of heads exhibiting Barkhausen noise can be reduced to 20% or less in the present invention. Preferably, the percentage of heads exhibiting Barkhausen noise can be reduced to 10% or less by controlling the thickness of the metal film 5 within a range of from 20 angstroms to 50 angstroms.

At a thickness of the metal film 5 of less than 18 angstroms, the percentage of heads exhibiting Barkhausen noise is significantly high, because exchange coupling occurs in the interface between the CoPt hard biasing layer 6 and the PtMn antiferromagnetic layer 1, the hard biasing layer 6 is barely put into a single magnetic domain in the X direction and the magnetization vector in the free magnetic layer 4 is not unified in the X direction.

On the other hand, at a thickness of the metal film 5 of greater than 55 angstroms, the percentage of heads exhibiting Barkhausen noise is also significantly high, because the bias magnetic field from the hard biasing layer 6 is not sufficiently applied to the free magnetic layer 4 because of the blocking effect of the metal film 5 and the magnetization vector in the free magnetic layer is not unified in the X direction.

A correlation between the overlap ratio $((d2/d3) \times 100)$, i.e., the overlap depth d2 to the thickness of the free magnetic layer d3, and the number of the magnetoresistive heads which exhibited Barkhausen noise, was observed by changing the thickness of the hard biasing layer 6, wherein the thickness of the metal film 5 was fixed at 30 angstroms, and the thickness and material of each layer other than the hard biasing layer 6 was the same as above. Noticeable Barkhausen noise was observed at eight overlap ratios $((d2/d3) \times 100)$, i.e., 100%, 80%, 60%, 40% and 20%, and with twenty magnetoresistive heads for each overlap ratio. The results are shown in Table 2.

TABLE 2

Percentage of Heads Exhibiting the Barkhausen Noise versus Overlap ratio

| Overlap ratio $(d2/d3) \times 100$ (%) | Number of heads exhibiting the noise | Percentage of heads exhibiting the noise (%) |
|---|---|---|
| 100 | 1/20 | 5 |
| 80 | 2/20 | 10 |
| 60 | 4/20 | 20 |
| 40 | 12/20 | 60 |
| 20 | 20/20 | 100 |

Figure 3:
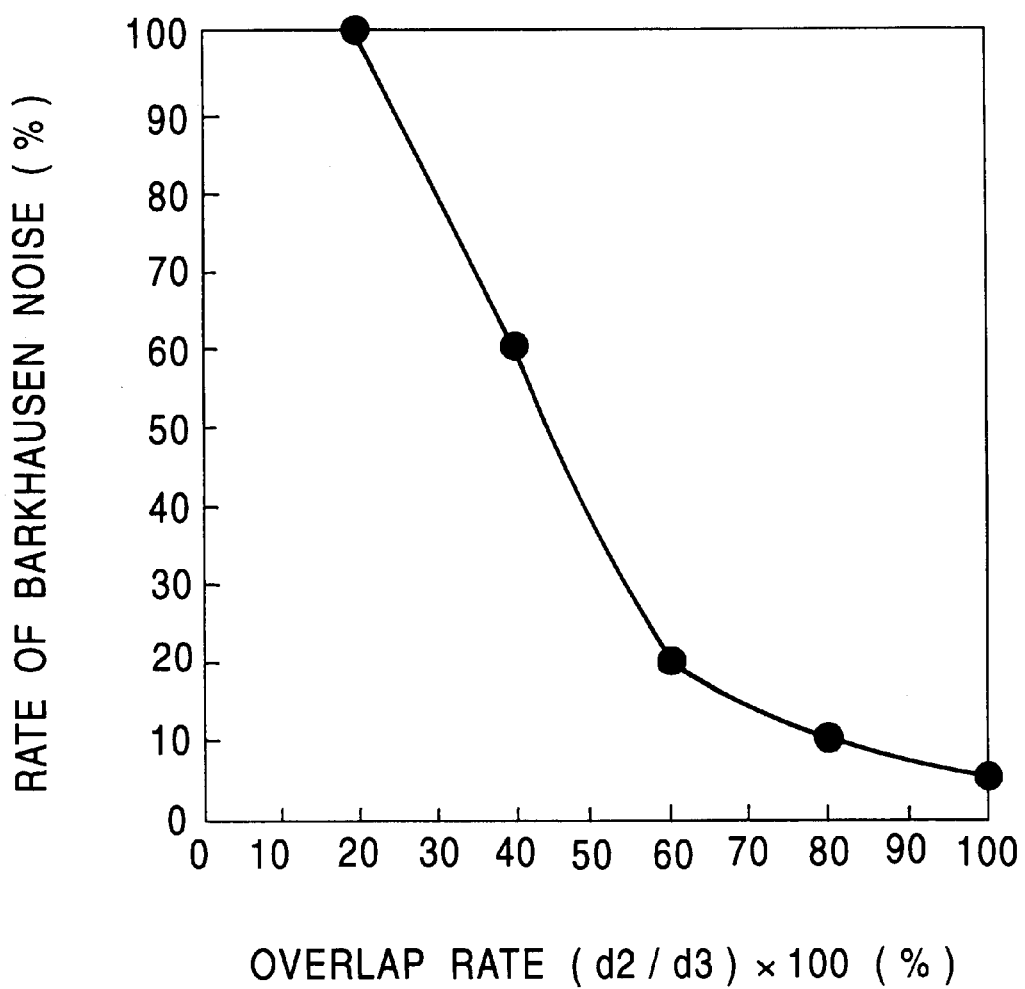
FIG. 3 is a graph illustrating the percentage of magnetoresistive heads which exhibit Barkhausen noise versus the overlap rate, (d2/d3)×100.
Figure 4:
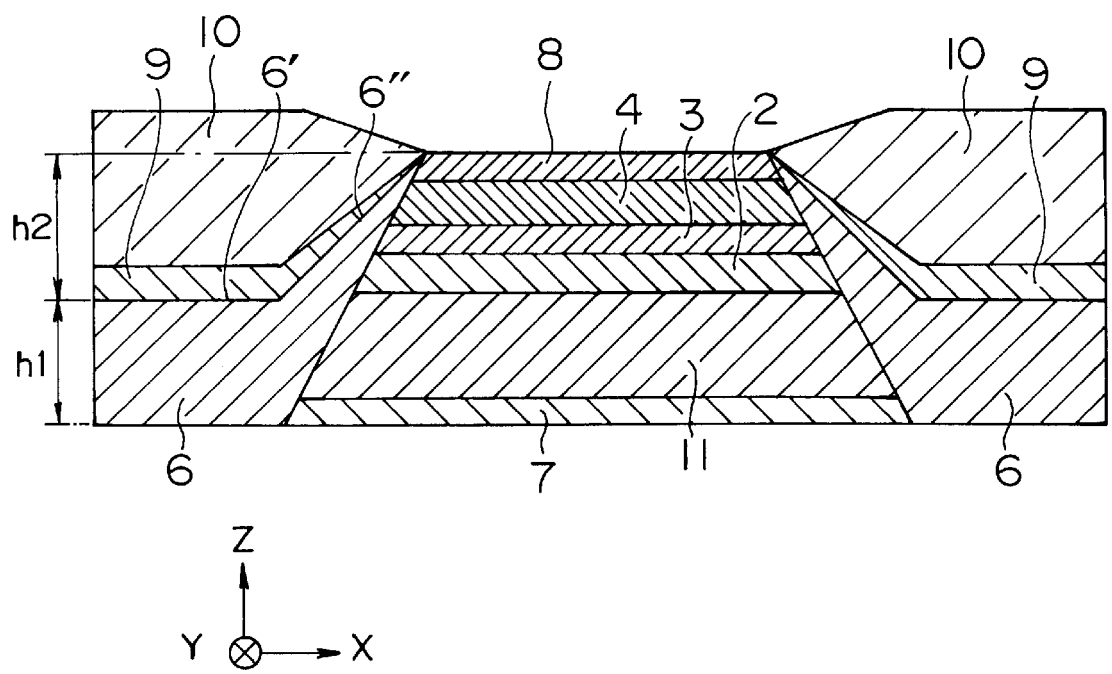
FIG. 4 is a sectional view of a prior art span-valve magnetoresistive element.

FIG. 3 is a graph illustrating the percentage of magnetoresistive heads which exhibit Barkhausen noise versus the overlap ratio, $(d2/d3) \times 100$, based on Table 2. FIG. 3 evidently demonstrates that the Barkhausen noise decreases as the overlap ratio increases. In particular, the percentage of heads exhibiting Barkhausen noise can be reduced to 20% or less when the overlap ratio is 60% or more. It is further preferable that the percentage of heads exhibiting Barkhausen noise be reduced to 10% or less by controlling the overlap ratio to be 80% or more. When the overlap ratio decreases, the Barkhausen noise more frequently occurs because the bias magnetic field from the hard biasing layer 6 is difficult to be applied to the free magnetic layer 4 and the magnetization vector in the free magnetic layer 4 is barely unified in the X direction.

In accordance with the present invention, since a biasing layer, which applies a bias magnetic field to a free magnetic layer, is formed above an antiferromagnetic layer, the hard biasing layer having horizontal faces can come close to the side faces of the free magnetic layer and can apply a strong bias magnetic field. The magnetization vector in the free magnetic layer can therefore be unified to a direction perpendicular to the magnetization vector in the pinned magnetic layer to reduce the Barkhausen noise. When the overlap ratio, $(d2/d3) \times 100$, is 0.60 or more, the Barkhausen noise can be further reduced.

Since a buffer film having a (bcc) lattice structure is formed under the biasing layer, the coercive force and squareness ratio of the biasing layer increase, resulting in an increase in the bias magnetic field which is required for putting the free magnetic layer into a single domain state. When the thickness of the buffer film is within a range of from 18 angstroms to 55 angstroms, a strong magnetic field can be applied to the free magnetic field to further decrease the occurrence of Barkhausen noise.

What is claimed is:

1. A spin-valve magnetoresistive element comprising: an antiferromagnetic layer, a pinned magnetic layer, a nonmagnetic electrically conductive layer and a free magnetic layer formed in that order; and biasing layers formed on both sides of at least said free magnetic layer, the magnetization vector in said pinned magnetic layer being fixed by exchange anisotropic coupling with said antiferromagnetic layer, said biasing layers unifying the magnetization vector in said free magnetic layer in a direction perpendicular to the magnetization vector in said pinned magnetic layer; and a conductive path conducting a sensing current to said pinned magnetic layer, said nonmagnetic electrically conductive layer and said free magnetic layer;

wherein said antiferromagnetic layer extends to outer regions on both sides of said pinned magnetic layer, said nonmagnetic layer and said free magnetic layer, wherein continuous slanted faces reside on both sides extending over said free magnetic layer, said nonmagnetic electrically conductive layer, said sinned magnetic layer, and a part of said antiferromagnetic layer, and said biasing layers are disposed above said antiferromagnetic layer in outer regions and on the continuous slanted faces so as to achieve electrical contact with these layers, wherein top faces of said outer regions of said antiferromagnetic layer lie below a bottom face of the pinned magnetic layer, and wherein top faces of said biasing layers being parallel to the free magnetic layer lie above a bottom face of said free magnetic layer in direction perpendicular to the bottom face of the free magnetic layer, and wherein a metal film resides between said antiferromagnetic layer and said biasing layer.

2. A spin-valve magnetoresistive element according to claim 1, wherein said metal film has a body centered cubic lattice structure oriented to (100).

3. A spin-valve magnetoresistive element according to claim 2, wherein said metal film is formed of at least one material selected from the group consisting of Cr, Ti, Mo and W.

4. A spin-valve magnetoresistive element according to claim 3, wherein said metal film has a thickness in a range from 18 angstroms to 55 angstroms.

5. A spin-valve magnetoresistive element according to claim 4, wherein the distance between the top face of said biasing layer and the bottom face of said free magnetic layer in a direction perpendicular to the bottom face of the free magnetic layer is at least 60% of the thickness of said free magnetic layer.

6. A spin-valve magnetoresistive element according to claim 3, wherein said metal film has a thickness in a range from 20 angstroms to 50 angstroms.

7. A spin-valve magnetoresistive element according to claim 6, wherein the distance between the top face of said biasing layer and the bottom face of said free magnetic layer in a direction perpendicular to the bottom face of the free magnetic layer is at least 60% of the thickness of said free magnetic layer.

8. A spin-valve magnetoresistive element according to claim 3, wherein the distance between the top face of said biasing layer and the bottom face of said free magnetic layer in a direction perpendicular to the bottom face of the free magnetic layer is at least 60% of the thickness of said free magnetic layer.

9. A spin-valve magnetoresistive element according to claim 2, wherein said metal film has a thickness in a range from 18 angstroms to 55 angstroms.

10. A spin-valve magnetoresistive element according to claim 9, wherein the distance between the top face of said biasing layer and the bottom face of said free magnetic layer in a direction perpendicular to the bottom face of the free magnetic layer is at least 60% of the thickness of said free magnetic layer.

11. A spin-valve magnetoresistive element according to claim 2, wherein said metal film has a thickness in a range from 20 angstroms to 50 angstroms.

12. A spin-valve magnetoresistive element according to claim 11, wherein the distance between the top face of said biasing layer and the bottom face of said free magnetic layer in a direction perpendicular to the bottom face of the free magnetic layer is at least 60% of the thickness of said free magnetic layer.

13. A spin-valve magnetoresistive element according to claim 2, wherein the distance between the top face of said biasing layer and the bottom face of said free magnetic layer in a direction perpendicular to the bottom face of the free magnetic layer is at least 60% of the thickness of said free magnetic layer.

14. A spin-valve magnetoresistive element according to claim 1, wherein the distance between the top face of said biasing layer and the bottom face of said free magnetic layer in a direction perpendicular to the bottom face of the free magnetic layer is at least 60% of the thickness of said free magnetic layer.

15. A spin-valve magnetoresistive element according to claim 1, wherein said antiferromagnetic layer comprises an M—Mn alloy, and wherein M is an element selected from the group consisting of Pt and Pd.

16. A spin-valve magnetoresistive element according to claim 1, wherein said antiferromagnetic layer comprises a Pt—Mn—X alloy, and wherein X is at least one element selected from the group consisting of Ni, Pd, Rh, Ir, Cr, and Co.

17. A spin-valve magnetoresistive element according to claim 1, wherein said pinned magnetic layer comprises at least one element selected from the group consisting of Co, Ni and Fe.

* * * * *

UNITED STATES PATENT AND TRADEMARK OFFICE
CERTIFICATE OF CORRECTION

PATENT NO. : 5,959,810
DATED : September 28, 1999
INVENTOR(S) : Yoshihiko Kakihara, et al.

It is certified that error appears in the above-identified patent and that said Letters Patent is hereby corrected as shown below:

Claim 1, Col. 9, line 29, change "sinned" to -- pinned --.

Signed and Sealed this

Eighteenth Day of April, 2000

Attest:

Q. TODD DICKINSON

*Attesting Officer*            *Director of Patents and Trademarks*